United States Patent [19]

Pearson

[11] Patent Number: 5,042,228
[45] Date of Patent: Aug. 27, 1991

[54] METHOD AND COMBINATION FOR HEATING AND DISPENSING HOT MELT MATERIALS

[75] Inventor: Walter C. Pearson, St. Paul, Minn.

[73] Assignee: Minnesota Mining and Manufacturing Company, St. Paul, Minn.

[21] Appl. No.: 509,370

[22] Filed: Apr. 16, 1990

Related U.S. Application Data

[62] Division of Ser. No. 216,798, Jul. 8, 1988, Pat. No. 4,926,029.

[51] Int. Cl.$^5$ .............................................. B65B 63/08
[52] U.S. Cl. ........................................ 53/440; 53/127; 53/456; 53/467; 53/482; 53/490; 141/11; 222/146.5
[58] Field of Search ................. 53/127, 371, 440, 452, 53/456, 467, 469, 481, 482, 490; 141/11, 82, 114; 219/214, 301, 302, 421, 423, 424, 425, 426, 521; 222/94, 105, 146.5

[56] References Cited

U.S. PATENT DOCUMENTS

| | | | |
|---|---|---|---|
| 1,828,865 | 10/1931 | Hopkins | 141/114 X |
| 2,381,716 | 8/1945 | Booth | 53/371 |
| 2,503,171 | 4/1950 | Power | 53/452 X |
| 2,691,474 | 10/1954 | Olson | 53/481 X |
| 3,273,310 | 9/1966 | Freeman | 53/371 |
| 4,040,233 | 8/1977 | Valyi | 53/440 |
| 4,450,878 | 5/1984 | Takada et al. | 141/82 X |
| 4,815,636 | 3/1989 | Stede et al. | 222/146.5 |
| 4,926,029 | 5/1990 | Pearson | 222/146.5 X |

FOREIGN PATENT DOCUMENTS 2156440 10/1985 United Kingdom ............. 222/146.5

Primary Examiner—John Sipos
Attorney, Agent, or Firm—Gary L. Griswold; Walter N. Kirn; William L. Huebsch

[57] ABSTRACT

A method for heating and dispensing hot melt materials in which the hot melt material is contained in a tube having a cylindrical outer surface portion over a majority of its length, and the hot melt material in the tube is heated by a heater assembly through a heat transfer member having a cylindrical inner surface adapted to closely receive the cylindrical outer surface portion of the tube.

3 Claims, 2 Drawing Sheets

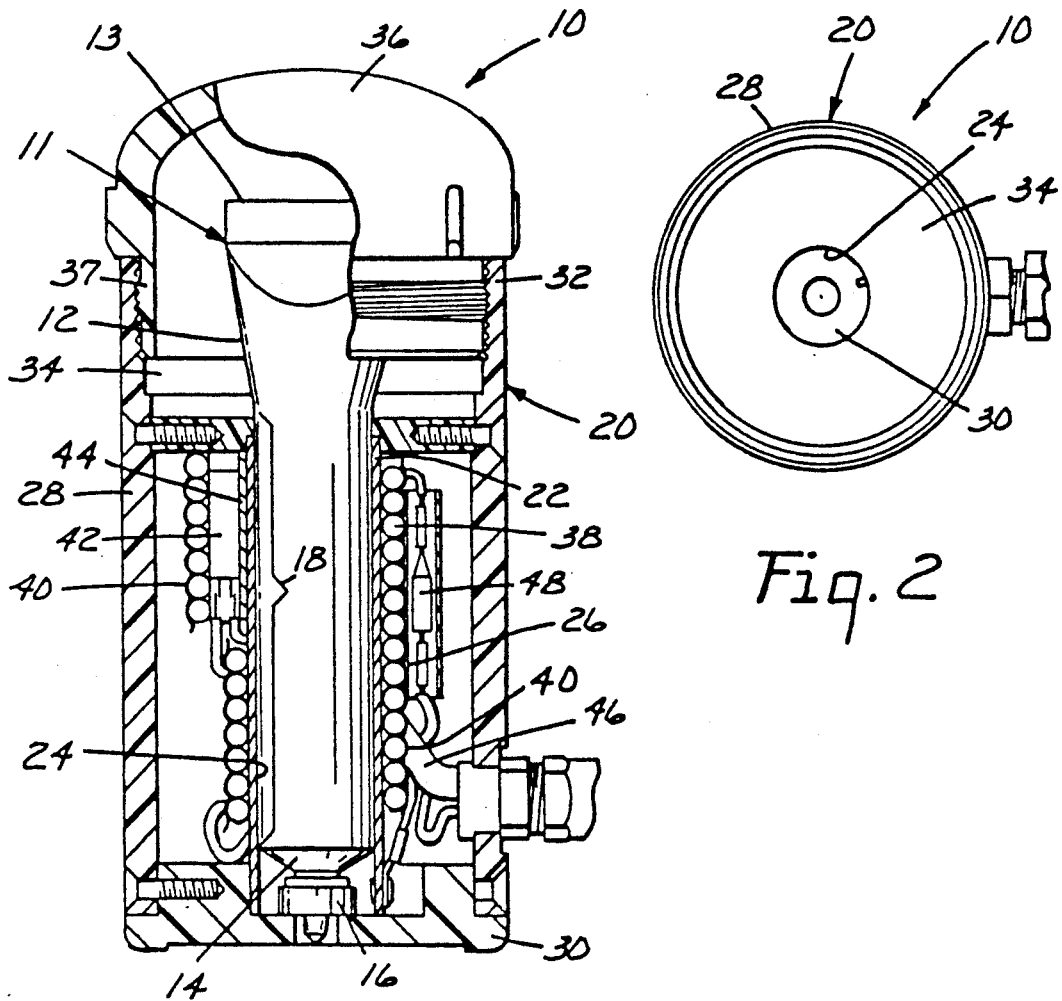
Fig. 2
Fig. 1
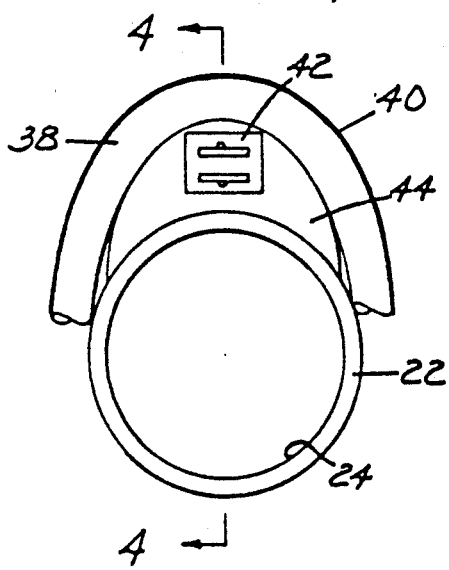
Fig. 3
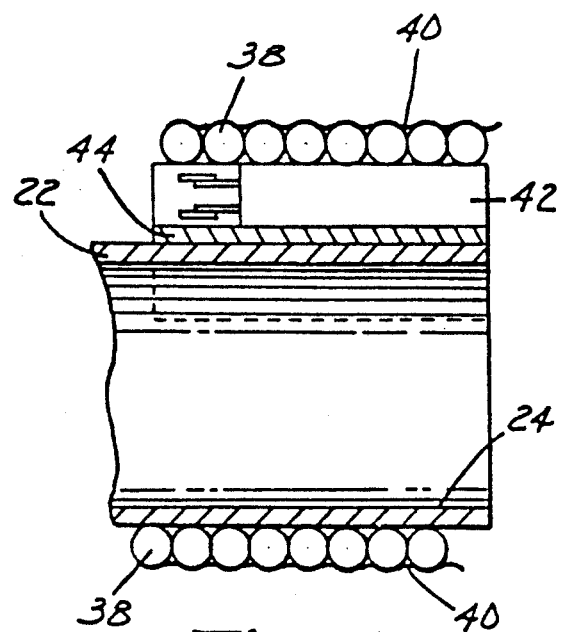
Fig. 4

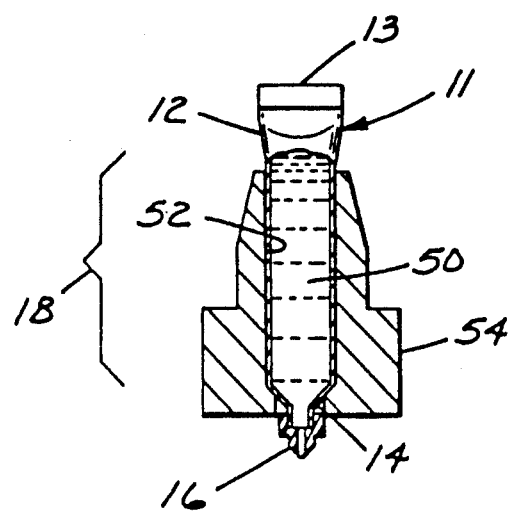
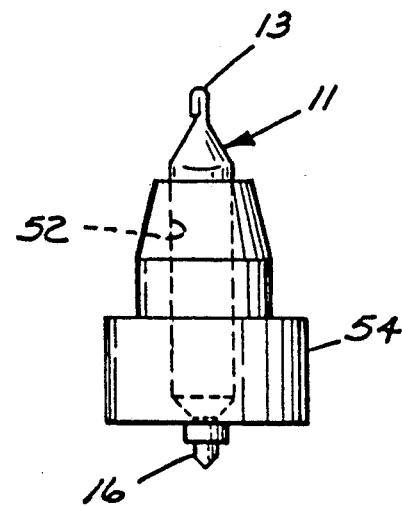
Fig. 5  Fig. 6
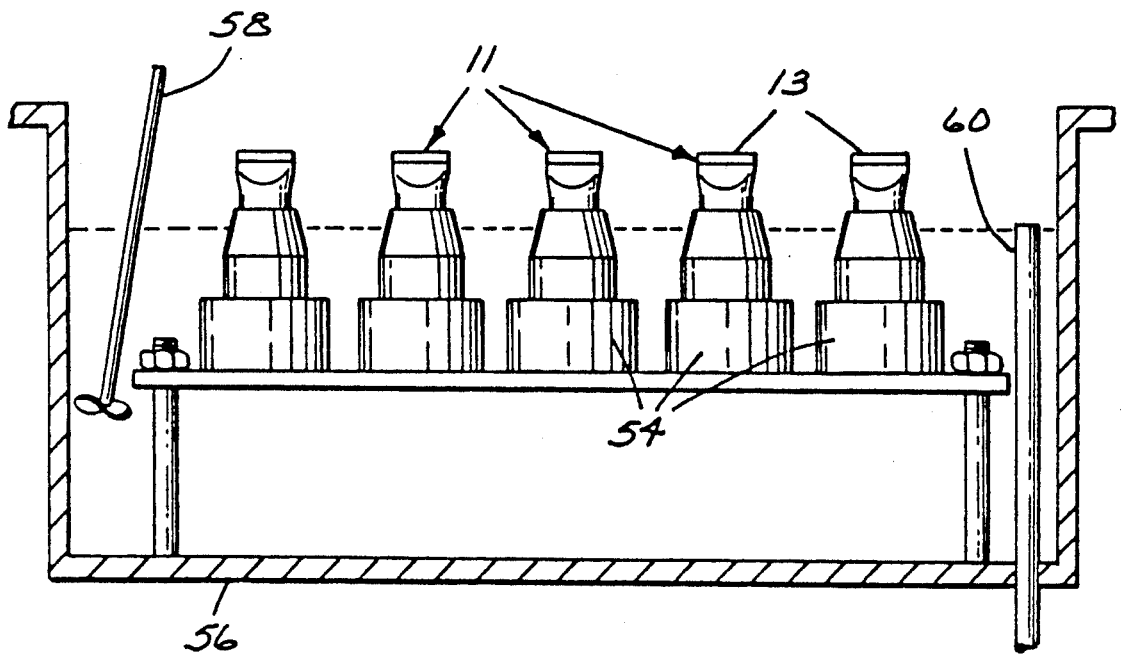
Fig. 7

5,042,228

METHOD AND COMBINATION FOR HEATING AND DISPENSING HOT MELT MATERIALS

This is a division of application Ser. No. 07/216,798 filed July 8, 1988, now U.S. Pat. No. 4,926,029.

TECHNICAL FIELD

The present invention relates to methods and combinations of structures utilized in heating and dispensing thermoplastic or hot melt materials, and in particular methods and combinations of structures utilized in heating and dispensing hot melt adhesives (i.e., by thermoplastic or hot melt materials we mean organic typically polymeric materials, including but not limited to adhesives, that are solids at normal room temperatures, will melt when heated to temperatures above room temperature, and will again solidify (and in the case of an adhesive adhere to a substrate) when returned to room temperature.

DISCLOSURE OF INVENTION

The present invention provides a convenient method and combination of structures for heating and dispensing small amounts of hot melt material such as the moisture curing hot melt adhesive described in copending U.S. patent application No. 201,169 filed June 2, 1988, the content whereof is incorporated herein by reference. The hot melt material is contained in a tube comprising a conformable metal hollow tubular wall, a closed second end, and an end wall having a central nozzle at a first end of the tubular wall. The tubular wall and the end wall define a cavity in which the hot melt material is contained, and the tubular wall has a cylindrical outer surface portion over a majority of the axial length of the tubular wall from its first end toward its second end. The hot melt material is heated in the tube by a heater assembly comprising a heat transfer member having a cylindrical inner surface adapted to closely receive the cylindrical outer surface portion of the tubular wall, and means for applying heat to the outer surface of the heat transfer member to heat the hot melt material within the cavity to a predetermined temperature through the heat transfer member and the tube (e.g., a thermostatically controlled elongate electric heating element coiled around the outer surface of the heat transfer member).

Preferably the heater assembly includes a housing comprising a generally cylindrical portion having a base end adapted to be supported on a horizontal surface with the axis of the cylindrical portion projecting vertically upward, the heat transfer member is mounted coaxially within the cylindrical portion of the housing and has an inlet end adjacent an upper end of the housing adapted to afford movement of the tube into and out of the heat transfer member with the end wall adjacent the base end of the cylindrical portion, and the housing further includes a cover portion adapted to releasably engage the upper end of the cylindrical portion of the housing over the closed second end of the tube received in the heat transfer member.

BRIEF DESCRIPTION OF DRAWING

The present invention will be further described with reference to the accompanying drawing wherein like reference numerals refer to like parts in the several views, and wherein:

FIG. 1 is a sectional side view of a heater assembly containing a tube of hot melt material included in the combination according to the present invention;

FIG. 2 is a top view of the heater assembly illustrated in FIG. 1 with the tube and a cover portion of the heater assembly removed;

FIG. 3 is an enlarged fragmentary sectional view showing detail of a thermostat included in the heater assembly of FIG. 1;

FIG. 4 is an enlarged fragmentary sectional view taken approximately along line 4—4 of FIG. 3; and FIGS. 5 through 7 are views, some of which are in section, that sequentially illustrate forming the tube of hot melt material illustrated in FIG. 1.

DETAILED DESCRIPTION

Referring now to the drawing, there is shown in FIGS. 1 through 4 a heater assembly 10 in which is positioned a tube 11 of hot melt material, both according to the present invention.

Generally the tube 11 comprises a conformable metal (e.g., aluminum) hollow tubular wall 12 having an axis, a second end 13 closed by folding and crimping an end portion of the tubular wall upon itself, and a tapered end wall 14 at a first end of the tubular wall 12, which end wall 14 has a central nozzle closed by a threadably attached cap 16. The tubular wall 12 and the end wall 14 define a cavity containing the hot melt material, and the tubular wall 12 has a cylindrical outer surface portion 18 over a majority of the axial length of the tubular wall 12 from its first end toward its second end (e.g., over half of that axial length and preferably at least 70 percent of that axial length). The heater assembly 10 for the tube 11 and hot melt material comprises a housing 20 of thermally insulating polymeric material, a hollow cylindrical metal (e.g., aluminum) heat transfer member 22 mounted within the housing 20 having a cylindrical inner surface 24 adapted to closely receive the cylindrical outer surface portion 18 of the tubular wall 12, and means for applying heat to an outer 26 surface of the heat transfer member 22 to heat the hot melt material within the cavity in the tube 11 to a predetermined temperature through the heat transfer member 22 and the tube 11.

As illustrated, the housing 20 comprises a generally hollow cylindrical portion 28 having a base end engaged with a circular base portion 30 so that by the base portion 30 the cylindrical portion 28 is adapted to be supported on a horizontal surface with an axis of the cylindrical portion 28 projecting vertically upward. The heat transfer member 22 is mounted coaxially within the cylindrical portion 28 of the housing 20 by having a lower end received in a socket in the base portion 30 and an inlet end adjacent an upper end 32 of the housing 20 received in a stepped opening through an upper circular support portion 34 of the housing 20 to afford movement of the tube 11 into the heat transfer member 22 to a fully engaged position shown in FIG. 1 with the end wall 14 of the tube 11 adjacent the base end of the cylindrical portion 28, the cap 16 resting on the base portion 30 with a central tip on the cap 16 projecting through a central opening therein, and the cylindrical outer surface portion 18 of the tubular wall in essentially full length engagement with the cylindrical inner surface 24 of the heat transfer member 22. The housing 20 further includes a cover portion 36 having a threaded lip 37 adapted to releasably engage mating threads adjacent the upper end 32 of the cylindrical portion 28 of the housing 20 over the closed second end 13 of the tube 11 received in the heat transfer member 22.

The means for applying heat to the outer surface 26 of the heat transfer member 22 to heat the hot melt material within the tube 11 to a predetermined temperature comprises an elongate rope like heating element 38 (e.g., a 250 watt 60 inch long heater) coiled around the outer surface 26 of the heat transfer member 22 and held in place by an overwrap of pressure sensitive adhesive coated tape 40 (e.g., glass electrical tape No. 69 available from Minnesota Mining and Manufacturing Company, St. Paul, Minn.), and a temperature controlling thermostat 42 connected in series with the heating element 38 and adhered in a slot along a metal (e.g., aluminum) contact shoe 44 between the coiled heating element 38 and the heat transfer member 22. Electrical power is applied to the heating element 38 through a conventional power cord 46 and a thermal cut out 48 which will open at a predetermined high temperature to prevents overheating of the system.

A method for forming the tube 11 containing hot melt material is illustrated in FIGS. 5 through 7. Generally that method comprises providing the tube 11 with its tubular wall 12 cylindrical along its entire length and its second end 13 open as is illustrated in FIG. 5 (which is a conventional shape for an unfilled tube); melting and pouring hot melt material 50 into the open second end 13 of the tube 11; folding and crimping closed the second end 13 of the tube 11 to the shape illustrated in FIG. 6; cooling the hot melt material filled and crimped tube 11 as is illustrated in FIG. 7; and supporting the cylindrical outer surface portion 18 of the wall 12 to be sure it retains its cylindrical shape during the pouring, crimping and cooling steps. Such support for the cylindrical outer surface portion 18 of the tube 11 during those steps (which is particularly needed during the crimping step) can be provided by a cylindrical surfaces 52 defining a bore in a block 54 (e.g., of aluminum), which surface 52 insures that the outer surface portion 18 of the tube remains cylindrical to during those steps to subsequently insure a close fit between the cylindrical outer surface portion 18 of the tube 11 and the inner surface 24 of the heat transfer member 22 and thereby insure good heat transfer therebetween. As can be seen in FIG. 7, the cooling step can be performed by placing a plurality of the blocks 54 containing filled and crimped tubes 11 in a liquid filled cooling tank 56 in which the liquid is stirred by an agitator 58 and a maximum liquid level below the upper ends of the blocks 54 is assured by an open topped stand pipe 60.

To apply the hot melt material from the hot melt material filled tube 11, the tube 11 is first positioned in the heater assembly 10 with its cylindrical outer surface portion 18 in contact with the inner surface 24 of the heat transfer member 22 and the cover portion 36 is attached to the rest of the housing 20 as is illustrated in FIG. 1. Electrical power is applied to the heating element 38 to heat the material in the tube 11 primarily by conduction through the heat transfer member 22 and the tube 11. After an appropriate time to thoroughly heat the material in the tube 11 (e.g., 15 minutes), the cover portion 36 is removed, the tube 11 is withdrawn from the heater assembly 10, the cap 36 of the tube 11 is removed, and the heated liquid hot melt material is extruded from the tube 11 by pressing opposite sides of the wall 12 together.

The present invention has now been described with reference to one embodiment thereof. It will be apparent to those skilled in the art that many changes can be made in the embodiment described without departing from the scope of the present invention. Thus the scope of the present invention should not be limited to the structures described in this application, but only by structures described by the language of the claims and the equivalents of those structures.

I claim:

1. A method for heating and dispensing hot melt material including:

containing the hot melt material in a tube comprising a conformable metal hollow tubular wall having an axis, a closed second end, and a first end, and an end wall having a central nozzle closed by a removable cap at the first end of the tubular wall, the tubular wall and the end wall defining a cavity in which the hot melt material is contained, and the tubular wall having a cylindrical outer surface portion over a majority of the axial length of the tubular wall from the first end toward the second end;

providing a heat transfer member having an outer surface and a cylindrical inner surface having an axis and adapted to closely receive the cylindrical outer surface portion of the tubular wall;

positioning the cylindrical outer surface portion of the tubular wall within the heat transfer member along its cylindrical inner surface;

applying heat to the outer surface of the heat transfer member to heat the hot melt material within the cavity to a predetermined temperature through the heat transfer member and the tube;

removing the cap from the nozzle; and pressing opposite sides of the conformable tubular wall together to extrude the heated liquid hot melt material from the tube through the nozzle.

2. A method according to claim 1 wherein said step of containing the hot melt material in the tube comprises providing the tube with its tubular wall cylindrical along its entire length and its second end open;

melting and pouring the hot melt material into the open end of the tube;

crimping closed the second end of the tube;

cooling the hot melt material filled and crimped tube; and supporting the outer surface of the tube to retain the portion of the outer surface of the tube in the cylindrical shape over the majority of the axial length of the tubular wall from the first end toward the second end during the crimping and cooling steps.

3. A method for heating hot melt material to be dispensed including:

containing the hot melt material in a tube comprising a conformable metal hollow tubular wall having an axis, a closed second end, and a first end, and an end wall having a central nozzle at the first end of the tubular wall, the tubular wall and the end wall defining a cavity in which the hot melt material is contained, and the tubular wall having a cylindrical outer surface portion over a majority of the axial length of the tubular wall from the first end toward the second end;

providing a heat transfer member having an outer surface and a cylindrical inner surface having an axis and adapted to closely receive the cylindrical outer surface portion of the tubular wall;

positioning the cylindrical outer surface portion of the tubular wall within the heat transfer member along its cylindrical inner surface; and applying heat to the outer surface of the heat transfer member to heat the hot melt material within the cavity to a predetermined temperature through the heat transfer member and the tube;

said step of containing the hot melt material in the tube comprising the steps of providing the tube with its tubular wall cylindrical along its entire length and its second end open;

melting and pouring the hot melt material into the open end of the tube;

crimping closed the second end of the tube;

cooling the hot melt material filled and crimped tube; and supporting the outer surface of the tube to retain the portion of the outer surface of the tube in the cylindrical shape over the majority of the axial length of the tubular wall from the first end toward the second end during the crimping and cooling steps.

* * * * *